(12) United States Patent
Mayville et al.

(10) Patent No.: US 8,783,188 B1
(45) Date of Patent: Jul. 22, 2014

(54) INFLATOR

(75) Inventors: Brian A. Mayville, Troy, MI (US);
Deborah L. Hordos, Troy, MI (US);
Scott M. Rambow, Roseville, MI (US)

(73) Assignee: TK Holdings Inc., Armada, MI (US)

( * ) Notice: Subject to any disclaimer, the term of this patent is extended or adjusted under 35 U.S.C. 154(b) by 0 days.

(21) Appl. No.: 13/174,769

(22) Filed: Jun. 30, 2011

Related U.S. Application Data (60) Provisional application No. 61/398,804, filed on Jun. 30, 2010.

(51) Int. Cl.
*B60R 21/26* (2011.01)
*B60R 21/264* (2006.01)

(52) U.S. Cl.
CPC ............... *B60R 21/26* (2013.01); *B60R 21/264* (2013.01); *B60R 21/2644* (2013.01)
USPC ........................................... 102/530; 280/741

(58) Field of Classification Search
USPC ............................ 102/530, 531; 280/741, 736
See application file for complete search history.

(56) References Cited

U.S. PATENT DOCUMENTS

| | | | | |
|---|---|---|---|---|
| 3,880,595 A | * | 4/1975 | Timmerman | 422/164 |
| 5,441,302 A | * | 8/1995 | Johnson et al. | 280/736 |
| 5,673,933 A | * | 10/1997 | Miller et al. | 280/736 |
| 5,868,424 A | * | 2/1999 | Hamilton et al. | 280/741 |
| 5,890,735 A | * | 4/1999 | Smith | 280/737 |
| 5,907,120 A | * | 5/1999 | Mooney et al. | 102/521 |
| 6,062,142 A | * | 5/2000 | Scheffee | 102/289 |
| 6,155,600 A | * | 12/2000 | Reynolds et al. | 280/741 |
| 6,176,517 B1 | * | 1/2001 | Hamilton et al. | 280/736 |
| 6,468,370 B1 | * | 10/2002 | Blomquist | 149/88 |
| 6,983,956 B2 | * | 1/2006 | Canterberry et al. | 280/741 |
| 7,044,502 B2 | * | 5/2006 | Trevillyan et al. | 280/741 |
| 8,273,199 B1 | * | 9/2012 | Hordos et al. | 149/61 |
| 2012/0125219 A1 | * | 5/2012 | Mayville et al. | 102/530 |

FOREIGN PATENT DOCUMENTS

WO    WO 2008053097 A2 *  5/2008

* cited by examiner

*Primary Examiner* — James Bergin (74) *Attorney, Agent, or Firm* — L.C. Begin & Associates, PLLC (57) ABSTRACT

An inflator containing a housing having a first end and a second end is provided. An igniter is fixed within the first end of the housing for ignition of gas generant charges within the housing. A discrete fuel charge and a discrete oxidizer charge ignitably communicates with the igniter. The fuel charge and the oxidizer charge may be axially aligned and are substantially simultaneously combusted upon actuation of the inflator.

17 Claims, 6 Drawing Sheets

INFLATOR

CROSS-REFERENCE TO RELATED APPLICATIONS

This application claims the benefit of U.S. Provisional Application Ser. No. 61/398,804 filed on Jun. 30, 2010.

TECHNICAL FIELD

The present invention relates generally to gas generating systems, and to gas generating compositions employed in gas generator devices for automotive restraint systems, for example.

BACKGROUND OF THE INVENTION

The present invention relates to gas generant compositions that upon combustion produce a relatively smaller amount of solids and a relatively abundant amount of gas. It is an ongoing challenge to improve the manufacturing processes of gas generators and also, to enhance the safety of the manufacturing and shipping of gas generators containing gas generant compositions.

A solid pyrotechnic gas generating composition typically contains a fuel, an oxidizer, and other known constituents combined homogeneously in tablet, pellet, or granulated form for example. It has been believed that the homogeneity of the gas generant composition was necessary to provide a uniform combustion rate, and to provide reproducibility of performance of the associated gas generator. Nevertheless, the handling, manufacturing, packaging, and shipping of the compositions, in a variety of environmentally distinct ambient conditions, implicates safety concerns relative to the gas generator.

Current pyrotechnic airbag inflators utilize a primary gas generant that has fuels and oxidizers premixed and pressed, extruded, and cured and otherwise processed into a primary gas generant composition. The process of combining the fuels and oxidizers through pressing, extruding, and other processing results in a number of safety related costs that are incurred by the company and its employees. Other costs related to this approach include special shipping requirements, manufacturing requirements, machine requirements, handling requirements, training, and other procedures, for example. Reducing these costs, and improving the safety and handling of various pyrotechnic constituents would certainly be an improvement in the art.

SUMMARY OF THE INVENTION

The above-referenced concerns and others may be resolved by gas generators or gas generating systems containing a novel approach to providing primary gas generating compositions within the gas generator. An airbag inflator utilizes a formed main gas generant that is inert until loaded into the inflator hardware, and combusted therein. The primary gas generant is made of discrete fuel tablets loaded into the inflator, in juxtaposed but separated orientation with discrete oxidizer tablets, also loaded into the inflator. Although tablets are preferred, it is believed that other physical forms of the fuel and/or oxidizer may also be employed as determined by design criteria.

A solid pyrotechnic primary gas generating composition typically contains a fuel, an oxidizer, and other known constituents combined homogeneously in tablet, pellet, or granulated form for example. The present invention harnesses the newly discovered advantage of separately loading discrete fuel wafers and discrete oxidizer wafers into an associated inflator. Gas generant constituents formed in other useful shapes may be formed and loaded into the inflator, in vapor and operable communication, but separated by a screen or other permeable material, particularly when the inflator is actuated.

By utilizing a separate fuel and an oxidizer separated from the fuel, that are brought together in a heterogeneous but non-homogeneous relationship once loaded in the inflator, many of the special requirements and procedures can be eliminated thereby reducing risk, costs, shipping delays, and other less-than-desirable consequences. It will be appreciated that the term "homogeneous" as used herein is meant to convey that the fuel and oxidizer are intimately mixed into a standard uniform and well-mixed composition. On the other hand, the term "heterogeneous" is meant to convey that the fuel and the oxidizer are not mixed into a standard uniform and well-mixed composition, but are instead oriented in physical but separate juxtaposed relation to each other once loaded into an associated airbag inflator or other gas generating device. It will be appreciated that although the fuel and oxidizer wafers, for example, are combined when placed in the inflator, the constituents may be physically separated by a screen member or by some other permeable material.

Stated another way, the present invention includes an inflator containing a housing having a first end and a second end; an igniter fixed within the first end of the housing; a fuel charge in ignitable communication with the igniter; and an oxidizer charge in ignitable communication with the igniter, and discrete and separate from and in combustible communication with said fuel charge. The term "discrete" is meant to be interpreted as separate from, wherein anything referred to as "discrete" is not mixed with an adjoining or juxtaposed constituent.

DETAILED DESCRIPTION OF THE PREFERRED EMBODIMENT(S)

A separate and discrete fuel may be formed into a wafer or other suitable shape such as a tablet, and is provided from an exemplary fuel selected from tetrazoles, bitetrazoles, guanidinium compounds, triazoles, triazines, hydrazides, carbazides, carboxylic acids, and/or mixtures thereof. An oxidizer is preferably formed into a wafer as well, and is selected from phase stabilized ammonium nitrate, alkali metal nitrates, transition metal nitrates, basic metal nitrates, metal and nonmetal perchlorates, mixtures, and salts thereof. Other known oxidizers may also be used. Additives include metal oxides, ammonium sulfate, processing aids, and other known constituents. The preferred fuel contains 5-aminotetrazole, potassium 5-aminotetrazole, and molybdenum trioxide. The preferred oxidizer is phase stabilized ammonium nitrate. If desired, the fuel or oxidizer wafers can be combined with other constituents typically found in gas generant compositions, slag formers or coolants, for example. All constituents may be formulated in a known manner, or, may be provided by known suppliers such as Aldrich, Fisher, and other chemical companies. Each fuel or oxidizer wafer or other desired shape may be pressed or otherwise formed in a known manner.

Figure 1:
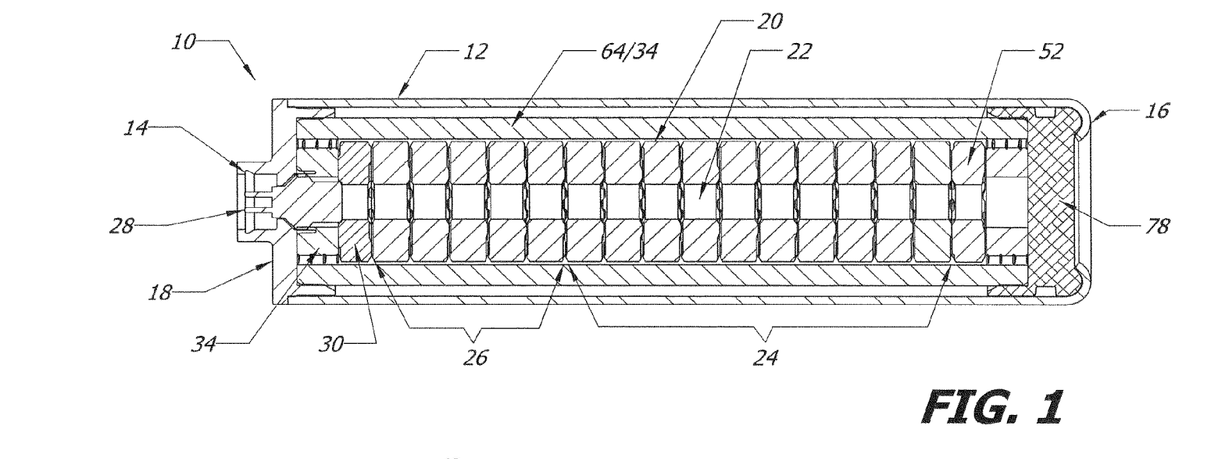
FIG. 1 is a first embodiment of the present invention, the embodiment including a first combustion chamber having juxtaposed and discrete fuel and oxidizer charges.

In a first embodiment shown in FIG. 1, an inflator 10 contains a perforate housing 12 having a first and second end 14,16, wherein the housing 12 is sealed in a known manner prior to actuation of the inflator 10. The inflator 10 is closed by an end closure 18 and seal at the first and second ends 14, 16. A gas generating chamber 20 is contained within the housing 12 for containment of a primary gas generant. A plurality of oxidizer wafers, each having an annular or other useful shape for example, may be stacked and oriented to extend through the gas generating chamber 20 from the second end 16 toward an interim or middle portion of the gas generating chamber 20. A plurality of fuel wafers 26, each also having an annular shape or other useful shape may be stacked or otherwise oriented to extend from the first oxidizer wafer 24 to a position proximate to the first end 14 of the housing 12. As implicit throughout FIGS. 1-9 and 11-12, the molar amounts of both the plurality of oxidizer wafers 24 or the plurality of fuel wafers 26 may be iteratively determined by calculating a desired oxygen balance with any given fuel and oxidizer combination, and then providing the respective amounts of oxidizer and fuel.

As shown in FIG. 1, an igniter 28 may be fixed within the first end 14 of the inflator 10 for ignition of the primary gas generant 22 containing the discrete fuel and oxidizer wafers 26, 24. A first booster wafer 30, made from a known material such as a gas generant described in U.S. Pat. No. 5,035,757, herein incorporated by reference, may be stacked between the fuel wafers 26 and the igniter 28, thereby providing a booster charge 30 for pressurization of the inflator 10 upon actuation thereof. An exemplary autoignition-booster (AIB) wafer 32, made as described in U.S. patent application Ser. No. 12/384, 563 for example and herein incorporated by reference in its entirety, may be stacked between the second end 16 and the gas generant charge 22 for additional booster function and also for auto-ignition function in the event of a bonfire for example. The booster and autoignition wafers are formed from materials known for their respective function in the art. Again, for the sake of illustration, the booster composition may be formed from compositions as described in U.S. Pat. No. 5,035,757, herein incorporated by reference.

Also referring to FIG. 1, a first spring 34 may be compressed between the first end 14 and the first booster wafer 30 thereby compressing the overall gas generant stack 22 to prevent fracturing and movement thereof. A second spring 36 may be compressed between the second end 16 and the second auto-ignition/booster wafer 32 thereby compressing the overall gas generant stack to prevent fracturing and movement thereof. A filter 34 is coextensive with the housing 12 and may be radially and outwardly oriented from an axis extending from the first end 14 to the second end 16 of the housing. A screen 40 or other permeable material may be positioned to physically separate the oxidizer wafers 24 from the fuel wafers 26. Although many shapes and orientation of the gas generant charge 22 is contemplated, wafers are one preferred form. When actuated, the wafers facilitate the heat and flame propagation down the middle of the stacked wafers, both fuel and oxidizer, thereby beginning combustion across the length of the inflator 10.

Figure 2:
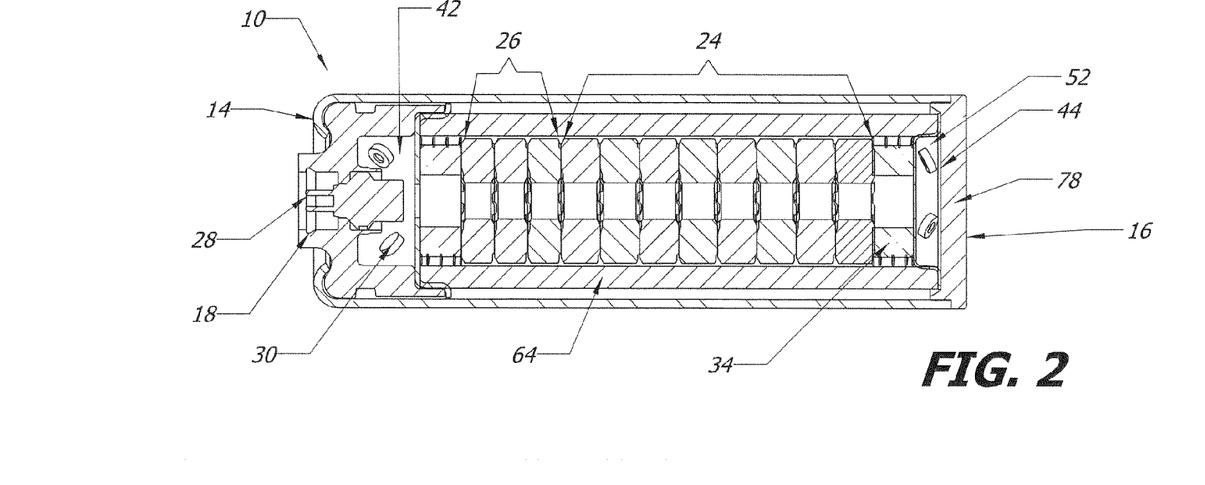
FIG. 2 is a second embodiment of the present invention, the embodiment including a first combustion chamber having juxtaposed and discrete fuel and oxidizer charges.

A second embodiment shown in FIG. 2 contains essentially the same features of the first embodiment shown in FIG. 1, and contains respective reference numerals to indicate the same features described in the first embodiment. However, the auto-ignition/booster materials are formed as smaller tablets rather than as wafers. As such, a first booster chamber 42 may contain a first booster charge 30 proximate to the first end 14 of the housing 12, in ignitable communication with the igniter 28. A second auto-ignition/booster chamber 44 may be positioned proximate to the second end 16 and houses the second auto-ignition/booster composition. When actuated, the igniter 28 activates the booster material, thereby pressurizing the inflator 10 for an even combustion of the primary gas generant as heat and flame propagates down the center of the wafers across the length of the inflator 10.

Figure 3:
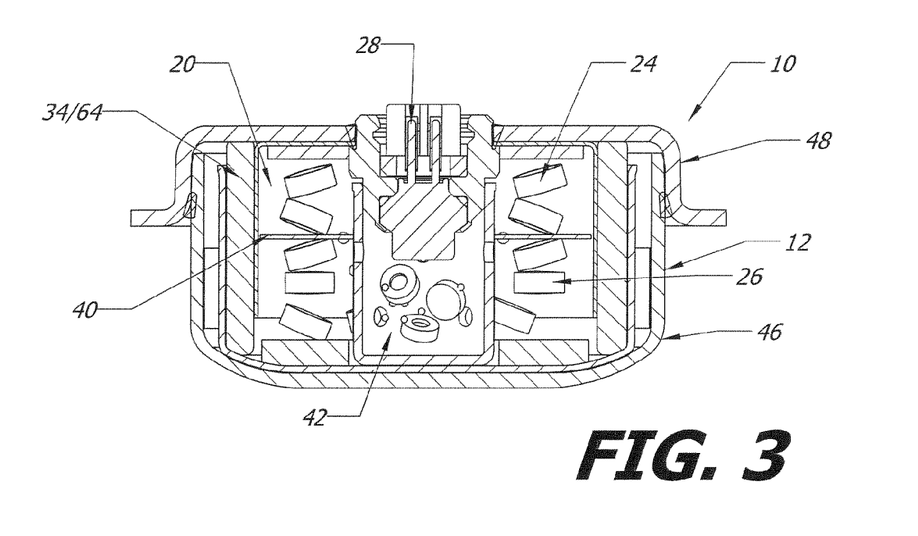
FIG. 3 is a third embodiment of the present invention, the embodiment including a first combustion chamber having juxtaposed and discrete fuel and oxidizer charges separated by a screen.

A third embodiment shown in FIG. 3 shows a driver-side inflator 10 containing a single booster chamber 42 containing an AIB material. A housing 12 contains a cap 46 and a base 48 that taken together form a perforate housing 12. A gas generating chamber 20 is divided in two by fixing a screen 40 across a lateral position of the inflator 10. The oxidizer tablets 24 may in this way therefore be physically separated from the fuel tablets 26. As shown in FIG. 3, the inflator 10 is otherwise manufactured in a known manner and again contains reference numerals as described relative to FIG. 1, indicating the same features as described relative to the first embodiment. For example, a radial filter 64 is positioned about the combustion chamber 20 for filtering of gases prior to release through the perforate housing 12.

Figure 4:
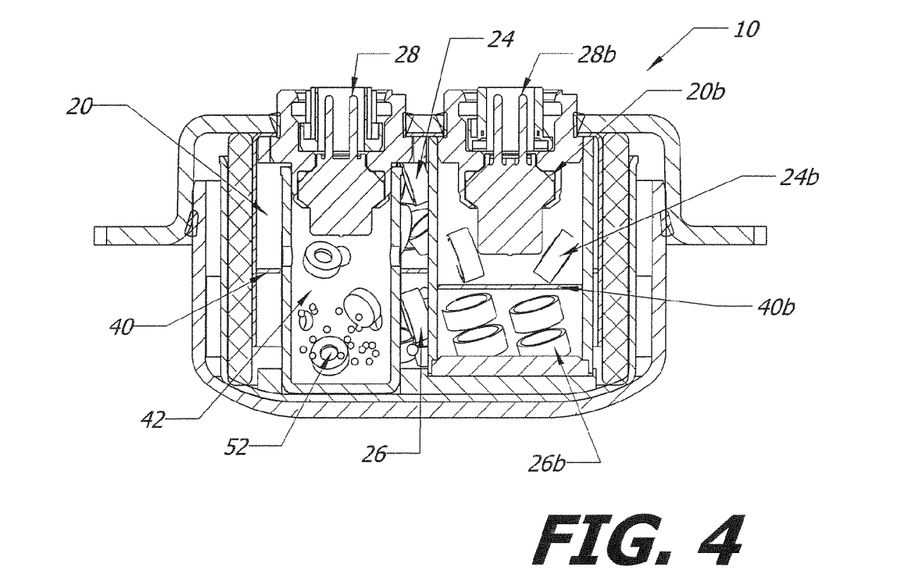
FIG. 4 is a fourth embodiment of the present invention, the embodiment including first and second combustion chambers, each combustion chamber including a set of discrete fuel and oxidizer charges.

A fourth embodiment shown in FIG. 4 is similar to that shown in FIG. 3 and again contains reference numerals that correspond to the same features of FIG. 3. FIG. 4, though, contains a programmable dual chamber configuration for greater flexibility when determining the necessary amount of gas for operation of the inflator 10. Accordingly, a first igniter 28 is fixed within an auto-ignition booster tube, thereby initiating the AIB composition 52 within the auto-ignition booster tube. The booster chamber 42 contains an AIB material for pressurizing the inflator 10 upon actuation thereof, and for enhanced safety in the event of a fire. As the AIB composition ignites, it transmits heat and/or flame propagation to the fuel wafers 26 and the oxidizer wafers 24 of the first combustion chamber 20 thereby facilitating combustion therein. As also shown in FIG. 4, a second combustion chamber 20b may also contain a second igniter 28b for initiating a second set of fuel wafers 26b and oxidizer wafers 24b as algorithmically determined. As shown, a first screen 40 separates the fuel wafers 26 and the oxidizer wafers 24 in the first combustion chamber 20, thereby facilitating the independent ignition of the fuel wafers 26 and oxidizer wafers 24 of the first chamber 20. In the same way, the fuel and oxidizer tablets of the second combustion chamber 20b are also divided by a second screen 40b thereby facilitating independent ignition of the fuel wafers 26b and the oxidizer wafers 24b. The booster chamber 42 contains an AIB material 52 for pressurizing the inflator 10 upon actuation thereof, and for enhanced safety in the event of a fire.

A fifth embodiment is shown in FIG. 5 and again contains a discrete plurality of fuel and oxidizer wafers 26, 24 biased by a spring 34 at the second end 16. Other features are illustrated and generally reveal a configuration similar to that shown in FIGS. 1 and 2. A second spring 36 is utilized at the second end 16 of the housing 12, whereby the spring 36 is oriented between the oxidizer wafers 24 and an AIB wafer or composition 52, thereby ensuring a snug fit of both the fuel and oxidizer wafers 26, 24, as well as the AIB composition 52.

Figure 5:
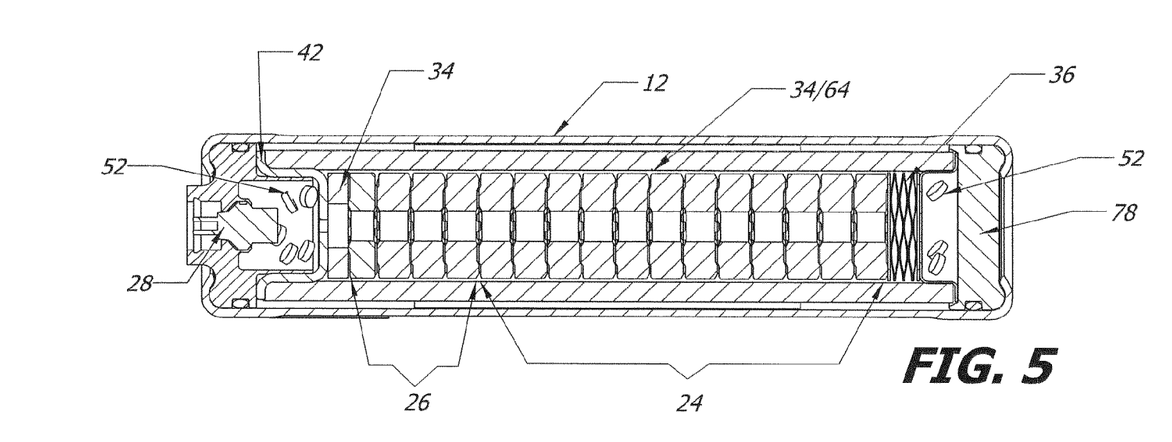
FIG. 5 is a fifth embodiment of the present invention, the embodiment including a first combustion chamber having juxtaposed and discrete fuel and oxidizer charges, and a radial and annular filter.
Figure 6:
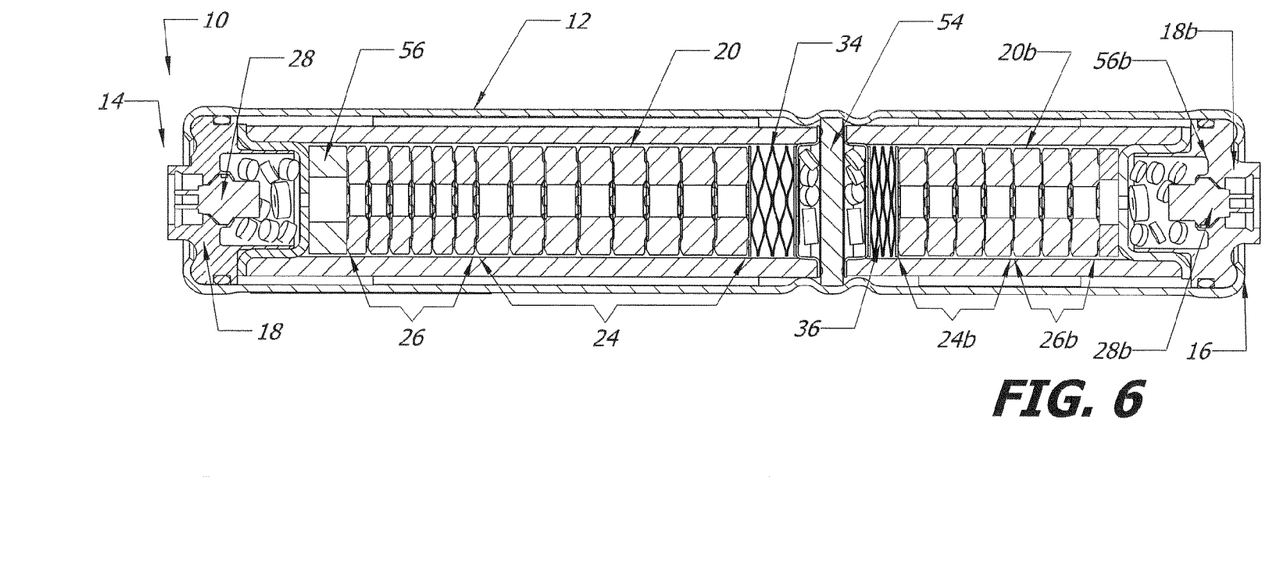
FIG. 6 is a sixth embodiment of the present invention, the embodiment including first and second combustion chambers, each combustion chamber including a set of discrete fuel and oxidizer charges.

A sixth embodiment is shown in FIG. 6 and contains a dual chamber configuration similar to the embodiments shown in FIGS. 1, 2, and 5. A perforate housing 12 or body contains the various constituents of the inflator 10 as described immediately below. As shown in FIG. 6, the first combustion chamber 20 and the second combustion chamber 20b are separated by a center wall 54 extending across the diameter of the inflator 10. A first cushion 56 is positioned between the first end closure 18 and the first fuel charge 26. A second cushion 56b is positioned between the second end closure 18b and the second fuel charge 26b. A first spring 34 is positioned on a port side of the imperforate divider 54 and functions to bias the first oxidizer charge 24 into a tighter fit within the first chamber 20. A second spring 36 is positioned on a starboard side of the imperforate divider 54 and functions to bias the second oxidizer charge 24a into a tighter fit within the second chamber 20b. A first combustion chamber 20 and a second combustion chamber 20b correspondingly ignitably communicate with a respective first igniter 28 and second igniter 28b at a respective first end 14 and a second end 16 of the housing 12. Again, each combustion chamber has a plurality of juxtaposed discrete fuel and oxidizer wafers that may be separated by a screen for example. It will be appreciated that this embodiment illustrates a programmable inflator 10, containing combustion chambers that can be selectively operated during a crash event, for various conditions including providing for smaller or larger occupants, or out-of-position occupants, for example. Again, other similar features contain similar reference numbers as described in the other embodiments.

Figure 7:
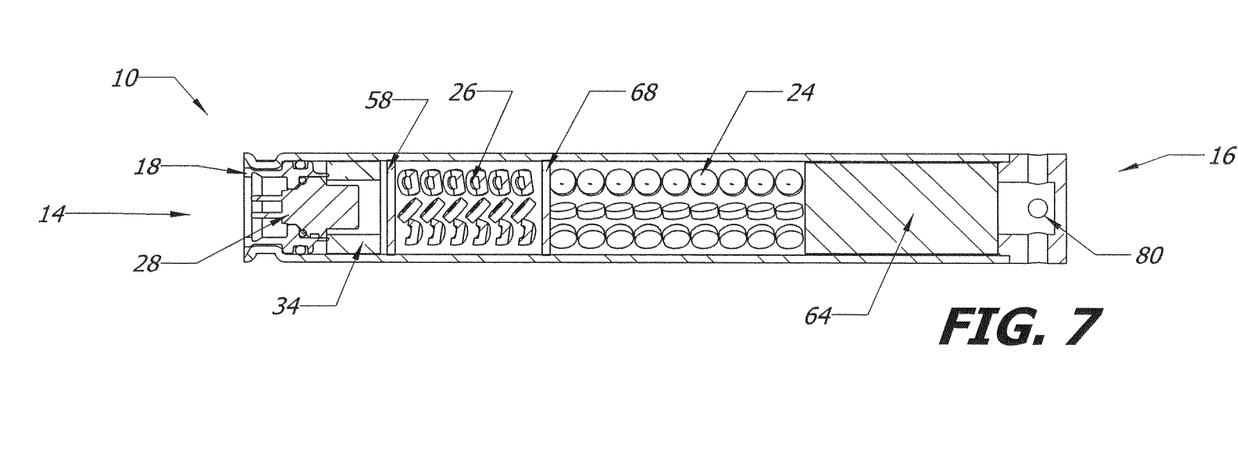
FIGS. 7-9 are additional embodiments of the present invention, the embodiments including a fuel chamber, an oxidizer chamber, and an axial filter, in axial and juxtaposed relation to each other.
Figure 8:
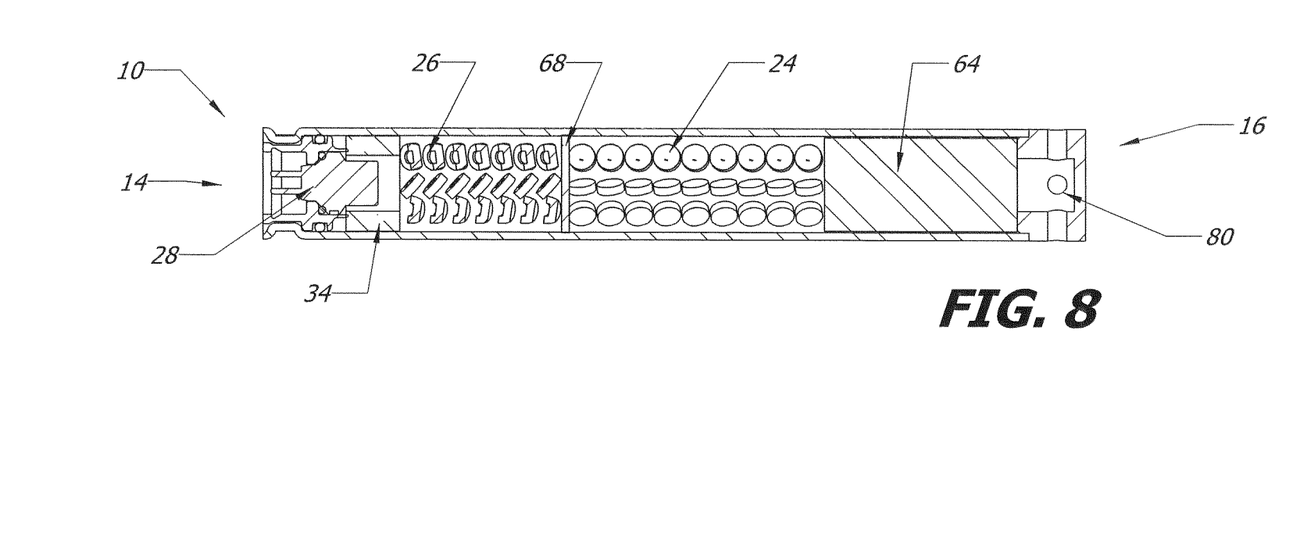
Figure 9:
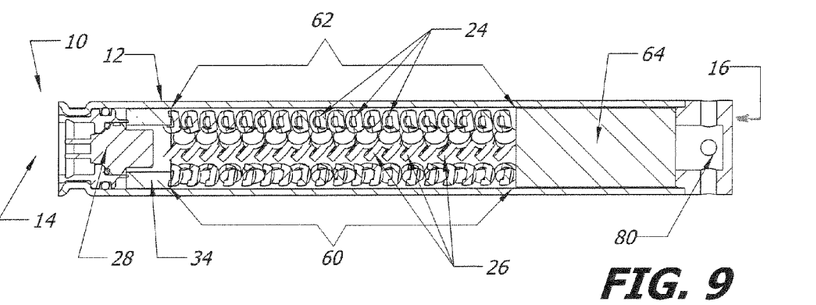

FIGS. 7-9 illustrate additional embodiments of the present invention and are similar to the aforementioned embodiments. Referring to FIGS. 7-9, a housing 12 or body contains a first end 14 and a second end 16. An igniter 28 is fixed within the first end 14 and when actuated, ignites a charge of fuel axially juxtaposed to the igniter 28. At substantially the same time, an oxidizer charge 24 axially juxtaposed to the fuel charge 26, is also ignited by the ignition products, heat, and/or flame propagation down the central length of the housing 12. A first end closure or body bore seal 18 is provided to seal the igniter 28 within the first end 14. A cushion or spring 34 is provided between the body bore seal 18 and the bed of randomly-oriented fuel tablets 26. If desired, a first perforate spacer 58 may be provided between the cushion or spring 34 and the bed of fuel 26. Further, if desired, a second perforate spacer 68 may be provided between the fuel charge 26 and the oxidizer charge 24 axially disposed along the length of the housing 12. It will be appreciated that as shown in FIG. 9, the fuel charge or wafers 26 and the oxidizer charge or wafers 24 may be radially juxtaposed to form a first arcuately and axially extending chamber 60 of fuel wafers 26, and a second arcuately and axially extending chamber 62 of oxidizer wafers 24 that is coextensive with the first arcuately and axially extending chamber 60 of fuel wafers. As with the other embodiments, the fuel and oxidizer charges of FIG. 9 may be physically separated within the combustion chamber 20, by use of a screen (not shown) for example. On the other hand, if the fuel and oxidizer are chemically compatible, a screen or spacer may not be required between the fuel and oxidizer charge, or between the booster and fuel, or booster and oxidizer, for example.

Still referring to FIGS. 7-9, a filter 64 is axially juxtaposed to the oxidizer charge 24 within the housing, for axial filtering of combustion products generated by combustion of the fuel and oxidizer charges. It will be appreciated that as opposed to the radial filtration of the other embodiments, these embodiments axially filter the products prior to release of the gas from the nozzle 80 at the second end 16 of the housing 12.

EXAMPLES

Example 1

Figure 11:
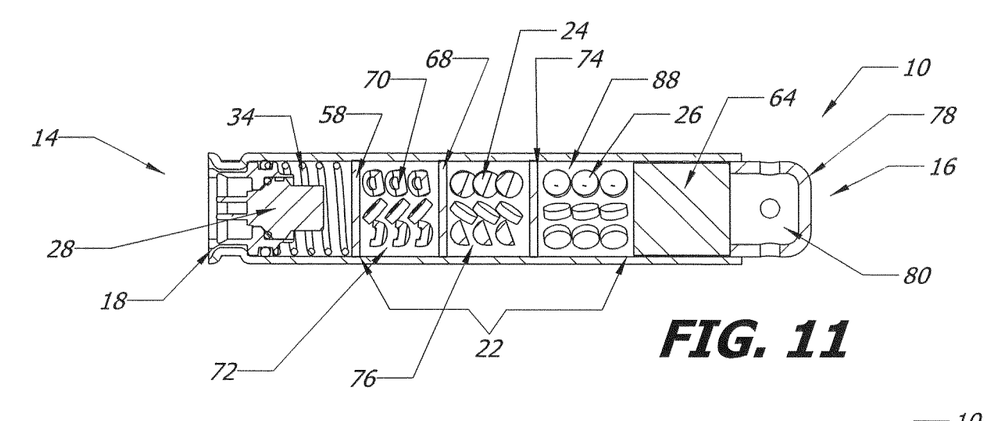
FIG. 11 is yet another embodiment of the present invention incorporating a solid booster charge axially aligned with a discrete fuel charge and a discrete oxidizer charge.

In one inflator embodiment, a booster system containing 3.0 grams of discrete booster pressed tablets, and an inert primary main gas generant containing fuel wafers containing 2.9 grams guanidine nitrate and 3.5 grams of oxidizer wafers containing phase stabilized ammonium nitrate (stabilized with 10-15 wt. % of potassium nitrate) and ammonium sulfate. In accordance with certain embodiments of the present invention, ammonium sulfate is typically provided at about 5-40 weight percent of the total oxidizer wafer, and the phase stabilized ammonium nitrate is nominally provided at about 60-95 weight percent of the total oxidizer wafer. A preferable amount of phase stabilized ammonium nitrate compared to ammonium sulfate is about 80 wt. % phase stabilized ammonium nitrate to about 20 wt. % ammonium sulfate. In general, throughout the examples and this description, it should be noted that the booster fuel and booster oxidizers may be provided in various ratios, one ratio ranging from 5-95 weight percent of the oxidizer and 5-95 weight percent of the fuel. Additionally, the primary gas generant may be formulated from fuels and oxidizers provided in various weight percent ranges, one set of weight percent ranges of 5-95 weight percent oxidizer and 5-95 weight percent fuel, and more preferably 20-80 weight percent oxidizer and 20-80 weight percent fuel, the weight percents taken with respect to the total weight of the primary fuel and primary oxidizer charges taken together. An inflator constructed as shown in FIG. 11, and loaded with the amounts given was actuated resulting in 41 ppm carbon monoxide, 34.6 ppm nitrogen monoxide, 0 ppm ammonia, 0.1 ppm nitrogen dioxide, and 34.7 ppm NOx, with a combustion pressure of 89.4 MPa.

Example 2

Figure 12:
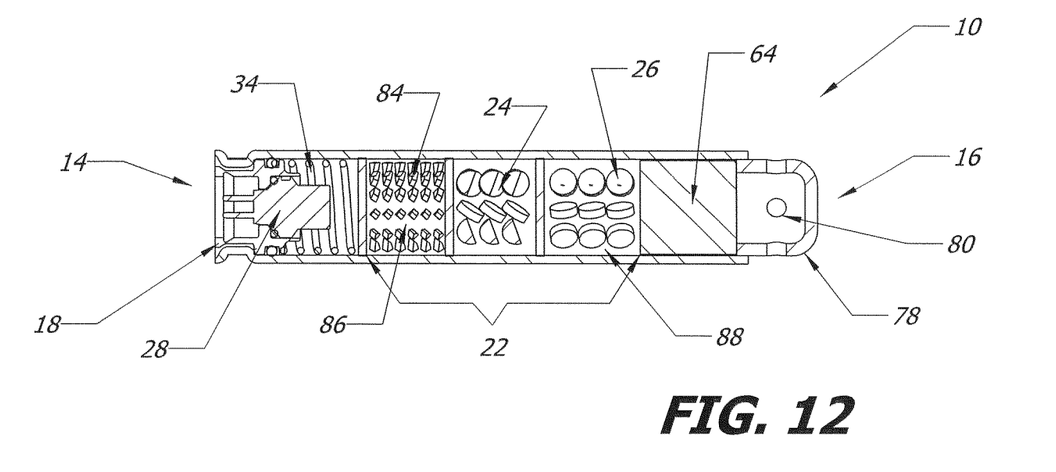
FIG. 12 is yet another embodiment of the present invention incorporating a granulated booster charge axially aligned with a discrete fuel charge and a discrete oxidizer charge.

In one inflator embodiment, a granulated booster system containing booster constituents of Example 1 was formulated wherein 1.8 grams of the booster oxidizer granules contained ammonium perchlorate and copper oxide, and, 1.2 grams of the booster fuel granules contained guanidine nitrate and maleic hydrazide. The granules were conventionally sized at −8/+40 grid. The primary gas generant contained 2.9 grams of fuel wafers containing guanidine nitrate, and 3.5 grams of oxidizer wafers containing phase stabilized ammonium nitrate (stabilized with 10-15 wt. % of potassium nitrate) and ammonium sulfate. An inflator constructed as shown in FIG. 12, and loaded with the amounts given was actuated resulting in 30.9 ppm carbon monoxide, 27.4 ppm nitrogen monoxide, 0 ppm ammonia, 0.02 ppm nitrogen dioxide, and 27.4 ppm NOx, with a combustion pressure of 102.8 MPa.

Example 3

In one inflator embodiment, a granulated booster system having larger granules than Example 2, conventionally sized at −8/+20 grid, and containing booster constituents of Example 1 was formulated wherein 1.8 grams of the booster oxidizer granules contained ammonium perchlorate and copper oxide, and, 1.2 grams of the booster fuel granules contained guanidine nitrate and maleic hydrazide. The primary gas generant contained 2.9 grams of fuel wafers containing guanidine nitrate, and 3.5 grams of oxidizer wafers containing phase stabilized ammonium nitrate (stabilized with 10-15 wt. % of potassium nitrate) and ammonium sulfate. An inflator constructed as shown in FIG. 12, and loaded with the amounts given was inflated resulting in 33.9 ppm carbon monoxide, 34.4 ppm nitrogen monoxide, 0 ppm ammonia, 0.05 ppm nitrogen dioxide, and 34.5 ppm NOx, with a combustion pressure of 87.5 MPa.

Example 4

In one inflator embodiment, a granulated booster system having larger granules than Example 2, conventionally sized at −8/+20 grid, and containing booster constituents of Example 1 was formulated wherein 1.7 grams of the booster oxidizer granules contained ammonium perchlorate and copper oxide, and, 1.3 grams of the booster fuel granules contained guanidine nitrate and maleic hydrazide. The primary gas generant contained 2.9 grams of fuel wafers containing guanidine nitrate, and 3.5 grams of oxidizer wafers containing phase stabilized ammonium nitrate (stabilized with 10-15 wt. % of potassium nitrate) and ammonium sulfate. An inflator constructed as shown in FIG. 12, and loaded with the amounts given was inflated resulting in 39.9 ppm carbon monoxide, 38.4 ppm nitrogen monoxide, 0 ppm ammonia, 0.03 ppm nitrogen dioxide, and 38.43 ppm NOx, with a combustion pressure of 71.3 MPa. Ballistic character of the inflator was evaluated in a 60 L tank wherein upon actuation, the peak tank pressure occurred at about 0.015 seconds at about 150 kPa.

Example 5

In one inflator embodiment, a granulated booster system having larger granules than Example 2, conventionally sized at −8/+20 grid, and containing booster constituents of Example 1 was formulated wherein 1.6 grams of the booster oxidizer granules contained ammonium perchlorate and copper oxide, and, 1.4 grams of the booster fuel granules contained guanidine nitrate and maleic hydrazide. The primary gas generant contained 2.9 grams of fuel wafers containing guanidine nitrate, and 3.5 grams of oxidizer wafers containing phase stabilized ammonium nitrate (stabilized with 10-15 wt. % of potassium nitrate) and ammonium sulfate. An inflator constructed as shown in FIG. 12, and loaded with the amounts given was inflated resulting in 35.8 ppm carbon monoxide, 46.1 ppm nitrogen monoxide, 0 ppm ammonia, 0.07 ppm nitrogen dioxide, and 46.17 ppm NOx, with a combustion pressure of 68.0 MPa. Ballistic character of the inflator was evaluated in a 60 L tank wherein upon actuation, the peak tank pressure occurred at about 0.017 seconds at about 144 kPa.

Example 6

In one inflator embodiment, a granulated booster system having larger granules than Example 2, conventionally sized at −8/+20 grid, and containing booster constituents of Example 1 was formulated wherein 1.5 grams of the booster oxidizer granules contained ammonium perchlorate and copper oxide, and, 1.5 grams of the booster fuel granules contained guanidine nitrate and maleic hydrazide. The primary gas generant contained 2.9 grams of fuel wafers containing guanidine nitrate, and 3.5 grams of oxidizer wafers containing phase stabilized ammonium nitrate (stabilized with 10-15 wt. % of potassium nitrate) and ammonium sulfate. An inflator constructed as shown in FIG. 12, and loaded with the amounts given was inflated resulting in 42.8 ppm carbon monoxide, 34.8 ppm nitrogen monoxide, 0.6 ppm ammonia, 0.1 ppm nitrogen dioxide, and 34.9 ppm NOx, with a combustion pressure of 78.5 MPa. Ballistic character of the inflator was evaluated in a 60 L tank wherein upon actuation, the peak tank pressure occurred at about 0.015 seconds at about 150 kPa.

Example 7

In one inflator embodiment, a granulated booster system having larger granules than Example 2, conventionally sized at −8/+20 grid, and booster constituents of Example 1 was formulated wherein 1.4 grams of the booster oxidizer granules contained ammonium perchlorate and copper oxide, and, 1.6 grams of the booster fuel granules contained guanidine nitrate and maleic hydrazide. The primary gas generant contained 2.9 grams of fuel wafers containing guanidine nitrate, and 3.5 grams of oxidizer wafers containing phase stabilized ammonium nitrate (stabilized with 10-15 wt. % of potassium nitrate) and ammonium sulfate. An inflator constructed as shown in FIG. 12, and loaded with the amounts given was inflated resulting in 40 ppm carbon monoxide, 31.7 ppm nitrogen monoxide, 2.9 ppm ammonia, 0.06 ppm nitrogen dioxide, and 31.76 ppm NOx, with a combustion pressure of 76.7 MPa. Ballistic character of the inflator was evaluated in a 60 L tank wherein upon actuation, the peak tank pressure occurred at about 0.015 seconds upon at about 145 kPa.

Example 8

In one inflator embodiment, a granulated booster system having larger granules than Example 2, conventionally sized at −8/+20 grid, and booster constituents of Example 1 was formulated wherein 1.8 grams of the booster oxidizer granules contained ammonium perchlorate and copper oxide, and, 1.2 grams of the booster fuel granules contained guanidine nitrate and maleic hydrazide. The primary gas generant contained 3.0 grams of fuel wafers containing guanidine nitrate, and 3.4 grams of oxidizer wafers containing phase stabilized ammonium nitrate (stabilized with 10-15 wt. % of potassium nitrate) and ammonium sulfate. An inflator constructed as shown in FIG. 12, and loaded with the amounts given was inflated resulting in 36 ppm carbon monoxide, 35.57 ppm nitrogen monoxide, 0 ppm ammonia, 0 ppm nitrogen dioxide, and 35.57 ppm NOx, with a combustion pressure of 80.8 MPa. Ballistic character of the inflator was evaluated in a 60

L tank wherein upon actuation, the peak tank pressure occurred at about 0.015 seconds upon at about 150 kPa.

Example 9

In one inflator embodiment, a granulated booster system having larger granules than Example 2, conventionally sized at −8/+20 grid, and booster constituents of Example 1 was formulated wherein 1.8 grams of the booster oxidizer granules contained ammonium perchlorate and copper oxide, and, 1.2 grams of the booster fuel granules contained guanidine nitrate and maleic hydrazide. The primary gas generant contained 3.1 grams of fuel wafers containing guanidine nitrate, and 3.3 grams of oxidizer wafers containing phase stabilized ammonium nitrate (stabilized with 10-15 wt. % of potassium nitrate) and ammonium sulfate. An inflator constructed as shown in FIG. 12, and loaded with the amounts given was inflated resulting in 32.9 ppm carbon monoxide, 39.6 ppm nitrogen monoxide, 0 ppm ammonia, 0.2 ppm nitrogen dioxide, and 39.8 ppm NOx, with a combustion pressure of 84.1 MPa. Ballistic character of the inflator was evaluated in a 60 L tank wherein upon actuation, the peak tank pressure occurred at about 0.015 seconds upon at about 152 kPa.

Example 10

In one inflator embodiment, a granulated booster system having larger granules than Example 2, conventionally sized at −8/+20 grid, and booster constituents of Example 1 was formulated wherein 1.8 grams of the booster oxidizer granules contained ammonium perchlorate and copper oxide, and, 1.2 grams of the booster fuel granules contained guanidine nitrate and maleic hydrazide. The primary gas generant contained 3.2 grams of fuel wafers containing guanidine nitrate, and 3.2 grams of oxidizer wafers containing phase stabilized ammonium nitrate (stabilized with 10-15 wt. % of potassium nitrate) and ammonium sulfate. An inflator constructed as shown in FIG. 12, and loaded with the amounts given was inflated resulting in 36.2 ppm carbon monoxide, 35.2 ppm nitrogen monoxide, 0 ppm ammonia, 0 ppm nitrogen dioxide, and 35.2 ppm NOx, with a combustion pressure of 79.9 MPa. Ballistic character of the inflator was evaluated in a 60 L tank wherein upon actuation, the peak tank pressure occurred at about 0.015 seconds upon at about 155 kPa.

Example 11

In one inflator embodiment, a granulated booster system having larger granules than Example 2, conventionally sized at −8/+20 grid, and booster constituents of Example 1 was formulated wherein 1.8 grams of the booster oxidizer granules contained ammonium perchlorate and copper oxide, and, 1.2 grams of the booster fuel granules contained guanidine nitrate and maleic hydrazide. The primary gas generant contained 3.3 grams of fuel wafers containing guanidine nitrate, and 3.1 grams of oxidizer wafers containing phase stabilized ammonium nitrate (stabilized with 10-15 wt. % of potassium nitrate) and ammonium sulfate. An inflator constructed as shown in FIG. 12, and loaded with the amounts given was inflated resulting in 32.6 ppm carbon monoxide, 37.3 ppm nitrogen monoxide, 0.5 ppm ammonia, 0.1 ppm nitrogen dioxide, and 37.4 ppm NOx, with a combustion pressure of 80.3 MPa. Ballistic character of the inflator was evaluated in a 60 L tank wherein upon actuation, the peak tank pressure occurred at about 0.017 seconds upon at about 152 kPa.

Figure 10:
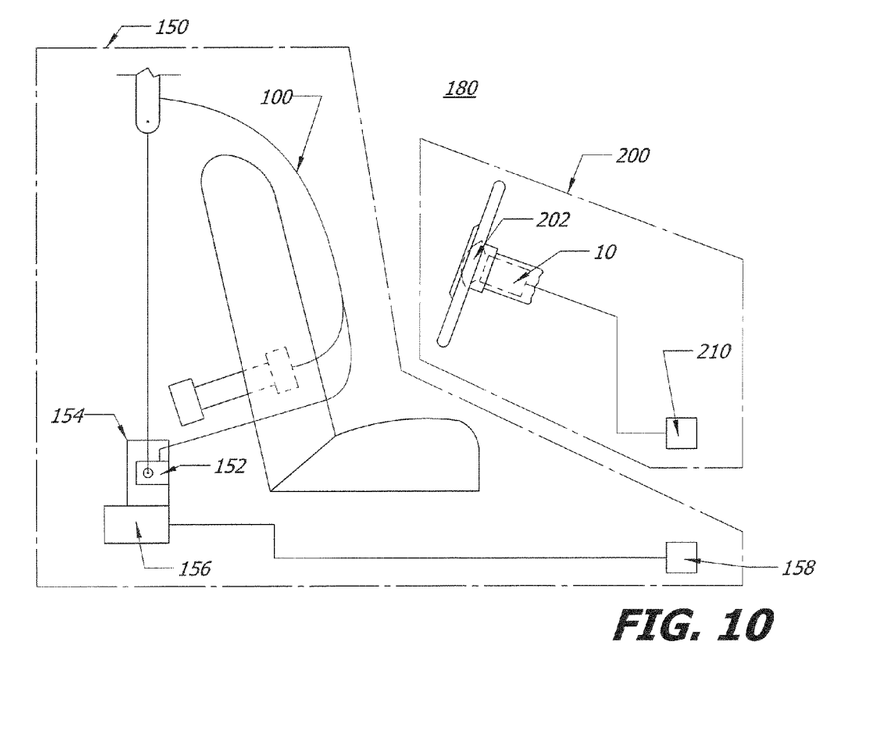
FIG. 10 is a schematic representation of a vehicle occupant protection system incorporating an inflator in accordance with the present invention.

Referring now to FIG. 10, the exemplary inflator or gas generating system 10 described above may also be incorporated into an airbag system 200. Airbag system 200 includes at least one airbag 202 and an inflator 10 containing a gas generant composition 12 in accordance with the present invention, coupled to airbag 202 so as to enable fluid communication with an interior of the airbag. Airbag system 200 may also include (or be in communication with) a crash event sensor 210. Crash event sensor 210 includes a known crash sensor algorithm that signals actuation of airbag system 200 via, for example, activation of airbag inflator 10 in the event of a collision.

Referring again to FIG. 10, airbag system 200 may also be incorporated into a broader, more comprehensive vehicle occupant restraint system 180 including additional elements such as a safety belt assembly 150. FIG. 10 shows a schematic diagram of one exemplary embodiment of such a restraint system. Safety belt assembly 150 includes a safety belt housing 152 and a safety belt 100 extending from housing 152. A safety belt retractor mechanism 154 (for example, a spring-loaded mechanism) may be coupled to an end portion of the belt. In addition, a safety belt pretensioner 156 containing gas generating composition 22 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558, 832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It should be appreciated that safety belt assembly 150, airbag system 200, and more broadly, vehicle occupant protection system 180 exemplify but do not limit gas generating systems contemplated in accordance with the present invention.

FIG. 11 is yet another embodiment of the present invention that includes an inflator having a housing 12 having a first and a second end 14, 16. A body bore seal or first closure 18 seals the first end 14. An igniter 28 is fixed within the first end closure 18 at the first end 14 for igniting the combustible material 22 within the housing 12. A first spring 34 is fixed against an inner wall 66 of the first end closure 18. A first perforate spacer 58 provides a closure for a booster composition 70, wherein the first spring 34 is positioned between the first end closure 18 and the first spacer 58. A booster propellant 70 formed as tablets sits within a booster chamber defined between the first spacer 58 and a second perforate spacer 68. A fuel 26 comprised of tablets or wafers, or any other suitable shape, is provided within a fuel chamber 88 defined between the second perforate spacer 68 and a third perforate spacer 74. An oxidizer 24 comprised of tablets or wafers, or any other suitable shape, is provided within an oxidizer chamber 76 defined between the third perforate spacer 74 and a juxtaposed axial filter 64. It should be appreciated that as with all embodiments, the oxidizer and fuel may be interchanged with regard to proximity to the igniter, thereby tailoring the burn and order of combustion as desired. Accordingly, although not shown, the oxidizer 24 may instead sit juxtaposed to the booster chamber 72, and the fuel 26 may sit juxtaposed to the oxidizer 24, between the third perforate spacer 74 and the axial filter 64, wherein the oxidizer 24 and the fuel 26 remain in axial alignment regardless of their proximity to the igniter 28. A second end closure 78 contains a nozzle 80 for egress of gas produced upon actuation of the inflator 10. Stated another way, the igniter 28 ignitably communicates and is in axial alignment with the oxidizer 24 and the fuel 26 for combustion thereof.

FIG. 12 is yet another embodiment of the present invention that includes an inflator 10 having a housing 12 having a first and a second end 14, 16. A body bore seal or first closure 18 seals the first end 14. An igniter 28 is fixed within the first end closure 18 at the first end 14 for igniting the combustible material within the housing 12. A first spring 34 is fixed against an inner wall 66 of the first end closure 18. A first perforate spacer 58 provides a closure for a booster composition 82, wherein the first spring 34 is positioned between the first end closure 18 and the first spacer 58. A granulated booster fuel 84 and granulated booster oxidizer 86 sits within a booster chamber 72 defined between the first spacer 58 and a second perforate spacer 68. The granulated booster oxidizer 86 may or may not be mixed with the granulated booster fuel 84. A fuel 26 comprised of tablets or wafers, or any other suitable shape, is provided within a fuel chamber 88 defined between the second perforate spacer 68 and a third perforate spacer 74. An oxidizer 24 comprised of tablets or wafers, or any other suitable shape, is provided within an oxidizer chamber 76 defined between the third perforate spacer 74 and a juxtaposed axial filter 64. It should be appreciated that as with all embodiments, the oxidizer and fuel may be interchanged with regard to proximity to the igniter, thereby tailoring the burn and order of combustion as desired. Accordingly, although not shown, the oxidizer 24 may instead sit juxtaposed to the booster chamber 72, and the fuel 26 may sit juxtaposed to the oxidizer 24, between the third perforate spacer 74 and the axial filter 64, wherein the oxidizer 24 and the fuel 26 remain in axial alignment regardless of their proximity to the igniter 28. A second end closure 78 contains a nozzle 80 for egress of gas produced upon actuation of the inflator 10. Stated another way, the igniter 28 ignitably communicates with and is in axial alignment with the oxidizer 24 and the fuel 26 for combustion thereof.

The inflators of the present invention are formed by known methods such as stamping, extrusion, and other known metal-forming methods. Further, the filters may be roll-formed, sintered, or otherwise formed as known in the art. The inflator 10 may be welded or otherwise sealed as known in the art. Constituents such as the igniters and filters may be provided by suppliers known in the art.

It should further be understood that the preceding is merely a detailed description of various embodiments of this invention and that numerous changes to the disclosed embodiments can be made in accordance with the disclosure herein without departing from the scope of the invention. The preceding description, therefore, is not meant to limit the scope of the invention.

What is claimed is:

1. An inflator comprising:
   a housing having a first end and a second end;
   an igniter fixed within the first end of the housing;
   a charge of solid fuel in ignitable communication with said igniter; and
   a charge of solid oxidizer in ignitable communication with said igniter, and discrete and separate from and in combustible communication with said fuel charge,
   wherein said solid fuel charge is positioned in a juxtaposed position relative to said solid oxidizer charge, and only one surface of said solid fuel charge is juxtaposed to said solid oxidizer charge.

2. The inflator of claim 1 wherein said inflator further comprises an annular radial filter contained within said housing for filtering of gases produced upon actuation of said inflator.

3. The inflator of claim 1 wherein said inflator further comprises a filter in axial alignment with said fuel charge and said oxidizer charge.

4. The inflator of claim 1 wherein said housing is perforated.

5. The inflator of claim 1 wherein said housing further contains a nozzle at said second end, for egress of gases produced upon actuation of said inflator.

6. The inflator of claim 1 further comprising a booster chamber containing a booster charge, said booster chamber is positioned proximate to said igniter.

7. The inflator of claim 1 wherein said booster charge contains a granulated oxidizer and a granulated fuel.

8. The inflator of claim 1 further comprising a permeable member physically separating the fuel charge and the oxidizer charge.

9. The inflator of claim 1 wherein the fuel charge comprises at least one wafer.

10. The inflator of claim 1 wherein the fuel charge comprises a plurality of wafers.

11. The inflator of claim 1 wherein the oxidizer charge comprises at least one wafer.

12. The inflator of claim 1 wherein the oxidizer charge comprises a plurality of wafers.

13. An inflator comprising:
    a housing having a first end and a second end;
    an igniter fixed within the first end of the housing;
    a plurality of solid fuel forms juxtaposed to each other in ignitable communication with said igniter; and
    a plurality of solid oxidizer forms juxtaposed to each other in ignitable communication with said igniter, and discrete, separate from, and in combustible communication with said plurality of solid fuel forms.

14. The inflator of claim 13 further comprising a booster composition juxtaposed next to said igniter.

15. The inflator of claim 13 wherein said plurality of solid fuel forms are shaped as annular wafers.

16. The inflator of claim 13 wherein said plurality of solid oxidizer forms are shaped as annular wafers.

17. An inflator comprising:
    a housing having a first end and a second end;
    a combustion chamber,
    an igniter fixed within the first end of the housing;
    a plurality of solid fuel forms contained within said combustion chamber and in ignitable communication with said igniter; and
    a plurality of solid oxidizer forms contained within said combustion chamber and in ignitable communication with said igniter,
    wherein said combustion chamber is divided to physically separate said plurality of solid fuel forms from said plurality of said solid oxidizer forms.

* * * * *